(No Model.)
S. J. WHITESIDE.
APPARATUS FOR DISTILLING AMMONIA.
No. 534,935. Patented Feb. 26, 1895.
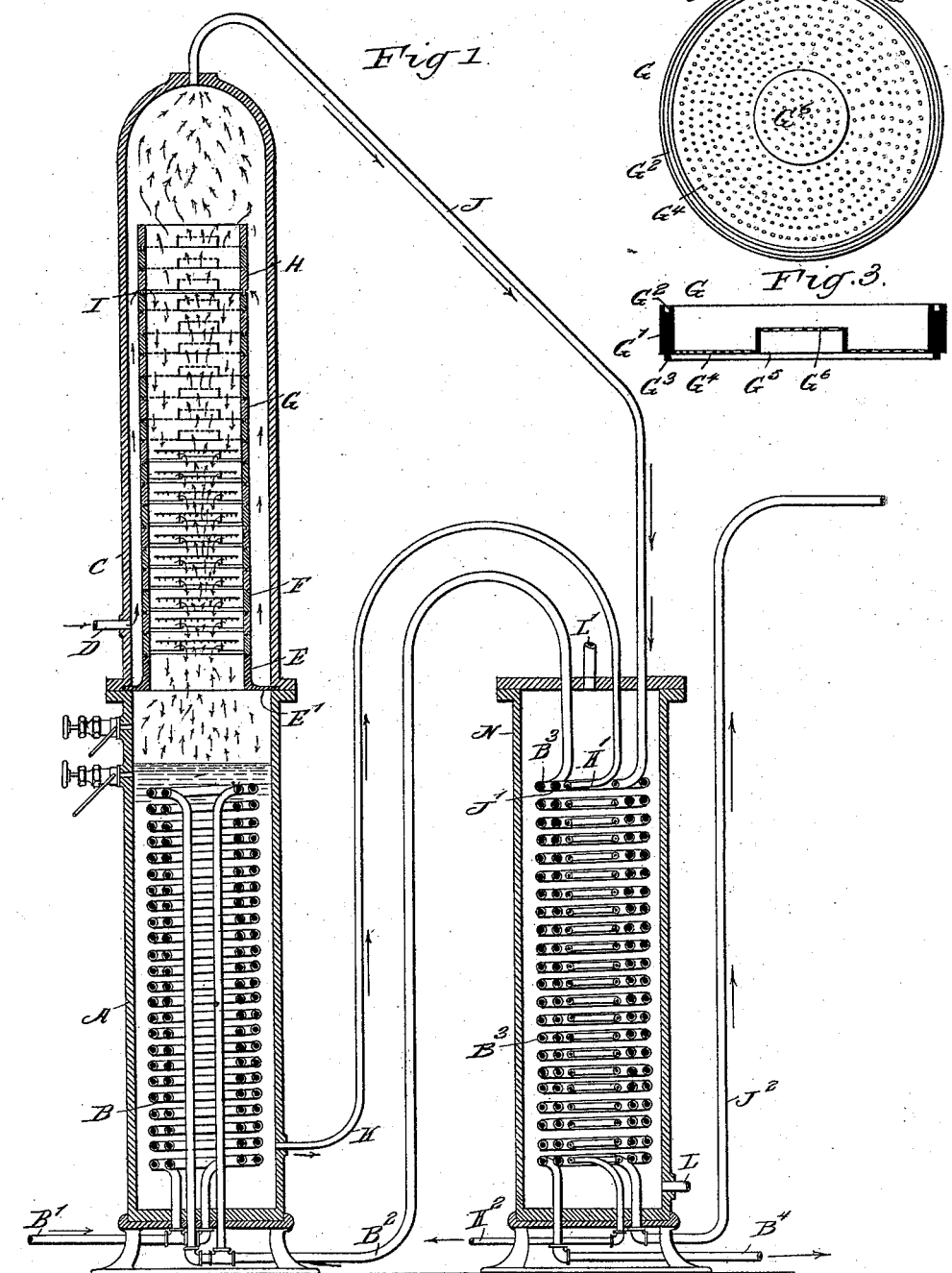
WITNESSES:
INVENTOR
ATTORNEYS.

UNITED STATES PATENT OFFICE.

SAMUEL J. WHITESIDE, OF SAVANNAH, GEORGIA.

APPARATUS FOR DISTILLING AMMONIA.

SPECIFICATION forming part of Letters Patent No. 534,935, dated February 26, 1895.

Application filed September 20, 1894. Serial No. 523,638. (No model.)

*To all whom it may concern:*

Be it known that I, SAMUEL J. WHITESIDE, of Savannah, in the county of Chatham and State of Georgia, have invented a new and Improved Apparatus for Distilling Ammonia, of which the following is a full, clear, and exact description.

The invention relates to ammonia distilling apparatus such as is used in connection with absorption ice machines, and its object is to provide a new and improved apparatus of this class whereby the ammonia is economically and thoroughly rectified before being expanded into the bath, and the feed water for the boiler is raised to a high degree of temperature, thus saving a large amount of fuel.

The invention consists in certain parts and details, and combinations of the same, as will be hereinafter fully described and then pointed out in the claims.

Reference is to be had to the accompanying drawings forming part of this specification, in which similar letters of reference indicate corresponding parts in all the views.

Figure 1 is a sectional side elevation of the improvement. Fig. 2 is an enlarged plan view of the rectifying pans; and Fig. 3 is a sectional side elevation of the same.

The improved apparatus is provided with the usual ammonia boiler A, adapted to receive the liquid ammonia, and provided with a steam heating coil B, connected by a pipe B' with a steam boiler (for instance the boiler of the ice making machine) and provided with an outlet steam pipe $B^2$ for leading off the steam to the condenser, as hereinafter more fully described.

On the top of the ammonia boiler A is set the rectifier C, forming an extension of the said boiler A, and provided near its lower end with a pipe D connected with the ammonia pump for pumping the liquid ammonia into the rectifier. Between the boiler A and the rectifier C is secured the flange E' of a vertically disposed cylinder E, supporting a stack of rectifying pans F, G, H, each having a solid rim set one on top of the other, the lowermost of the pans F being seated on the cylinder E, so that the several rims form a cylinder between which and the wall of the rectifier C, is formed sufficient space for the liquid ammonia going from the pump to rise to finally pass through an opening I, between the upper pan G and the lowermost pan H, to the under side of the pans, to form the gas as hereinafter more fully described.

The pans H are for the purpose of dividing and rectifying as completely as possible the ammonia gas generated in the rectifier, while the pans G serve to finely divide the liquid ammonia into minute drops, to cause the quick generation of the liquid ammonia into gas therein, and each of the said pans G and H is preferably formed in the manner shown in Figs. 2 and 3, each pan having in the top of its solid rim G' an annular groove $G^2$ adapted to be engaged by an annular tongue $G^3$, formed on the under side of each rim G'. Each pan G is further provided with a ring-shaped bottom $G^4$, made with perforations and on the inner edge of this bottom is arranged an annular wall $G^5$, extending about one half the height of the pan so as to be covered at its upper edge by a perforated plate $G^6$, as will be readily understood by reference to Fig. 3. Instead of the perforated bottom $G^4$ and plate $G^6$, wire cloth or other suitable material may be employed for the purpose of minutely dividing the descending liquid ammonia and ascending ammonia gas. Now it will be seen that the liquid ammonia passing through the opening I, into the uppermost of the pans G, flows onto the bottom $G^4$ and through the perforations thereof into the next lower pans. The liquid in flowing through these perforations is divided so as to readily change into gas. This operation is repeated through all the different pans G, for forming the gas. Now the gas generated can readily rise in the walls $G^5$, to pass upward through the plates $G^6$ so as to be divided and rectified and to finally rise through the uppermost set of pans H, where it is further rectified in a more complete manner, as the gas passing through the uppermost pans is not in direct contact with the strong liquor ammonia flowing downward through the pans G and F. The lowermost pans F are of the usual construction and finally discharge the liquid ammonia into the ammonia boiler A, to be heated by the heat emanating from the steam coil B, the gas rising in the stack of pans F, G, H, while the weak liquid remains in the bottom of the boiler, to be discharged as hereinafter described.

The rectified gas accumulated in the upper end of the rectifier C passes through the ammonia gas pipe J to the heater N, and forms in the latter a coil of pipe J', connected at its lower end by the pipe J² with the liquefying tank (not shown). The coil of pipe J' is surrounded by a steam coil B³ connected at its upper end with the steam pipe B² previously mentioned, and the lower end of this coil B³ is connected by the pipe B⁴ with the condenser (not shown).

Within the coil of pipe J' is arranged a coil of pipe K', connected at its upper end by the pipe K with the lower end of the ammonia boiler A, so that the weak liquor contained in the latter can pass the said pipe K, the coil K', to a pipe K² which returns the pure liquor to the exchanger for gas.

Now it will be seen that the liquid ammonia pumped into the rectifier C, passes up around the rims of the pans, but does not flow over the top pan H but through the opening I, into the stack of pans, to descend and to be minutely divided as previously described, so as to return formed into gas. The perforations in the plates G⁶ and those in the pans H serve to rectify the gas, while the heat from the sides and top acts as a strainer heater so as to drive off any moisture or waste still held by the gas when first freed from the drops of liquid ammonia.

The heater N is provided at its lower end with a pipe L, connected with the boiler feed pump so that the feed water is passed into this cylindrical heater and heated therein by the heat given off from the several coils J', B³, K', the heated water being passed at the upper end of the heater through a pipe L' to the boiler at a temperature of over 300° Fahrenheit.

It will be seen that by the arrangement of the coils of pipe in the heater N, the steam after it has done its work in the ammonia boiler A, and the gas after being formed in the rectifier C, are both passed through the said heater, to give off their heat, and likewise the weak ammonia is passed through the heater, and all three fluids pass through the heater in a downward direction, while the feed water passes from the bottom upward, thus being gradually heated o a very high degree of temperature. It is understood that the feed water is forced through the heater N under boiler pressure. It will be seen that as the feed water is heated by the gas and weak liquor in the heater N, a less amount of water is required in the cooler tank and liquefying tank.

Having thus described my invention, I claim as new and desire to secure by Letters Patent—

1. A distilling apparatus comprising a shell a stack of rectifying pans set within the shell and spaced therefrom so as to form an annular chamber, a liquid inlet located in the shell at the bottom of the said chamber, so that the liquid will rise therein and become heated by contact with the outer faces of the rectifying pans; and a liquid inlet located in the stack below the top of the same so that the gas only will pass through the upper part of the stack, substantially as and for the purpose set forth.

2. A distilling apparatus provided with a stack of rectifying pans, comprising a lowermost set of pans, a middle set of pans having a ring-shaped perforated bottom, a central wall covered on top by a perforated plate, and an uppermost set of pans between which and the middle set of pans passes the liquid ammonia to the middle set of pans, substantially as shown and described.

3. An ammonia distilling apparatus for ice making machines, provided with a heater through which passes the feed water under boiler pressure, a steam coil arranged in the said heater and connected with the heating coil in the ammonia boiler, a second coil for the ammonia gas and connected with the rectifier, and a third coil connected with the weak ammonia in the ammonia boiler, substantially as shown and described.

4. A distilling apparatus, provided with a rectifying pan having a solid rim, a ring-shaped perforated bottom, a wall set on the inner edge of the said bottom, and a perforated top plate for the said wall, substantially as shown and described.

SAMUEL J. WHITESIDE.

Witnesses:
J. H. CAVANAUGH,
SAML. M. WHITESIDE.